(12) United States Patent  
Beilstein

(10) Patent No.: US 8,448,278 B1
(45) Date of Patent: May 28, 2013

(54) RAMP SYSTEM FOR CARGO AIRPLANES

(71) Applicant: Richard R. Beilstein, Cedarburg, WI (US)

(72) Inventor: Richard R. Beilstein, Cedarburg, WI (US)

( * ) Notice: Subject to any disclaimer, the term of this patent is extended or adjusted under 35 U.S.C. 154(b) by 0 days.

(21) Appl. No.: 13/726,838

(22) Filed: Dec. 26, 2012

Related U.S. Application Data

(63) Continuation of application No. 13/541,699, filed on Jul. 4, 2012.

(51) Int. Cl.
E01D 1/00 (2006.01)

(52) U.S. Cl.
USPC ............................ 14/69.5; 244/137.1; 414/537

(58) Field of Classification Search
CPC .......................................................... B65G 69/30
USPC ............. 14/69.5; 244/118.3, 137.1; 414/537
See application file for complete search history.

(56) References Cited

U.S. PATENT DOCUMENTS

| | | | | |
|---|---|---|---|---|
| 2,523,723 A * | 9/1950 | Hess et al. | ..................... | 414/537 |
| 3,088,547 A * | 5/1963 | MacMillan | ..................... | 254/88 |
| 3,917,226 A * | 11/1975 | Palmer | ............................. | 254/88 |
| 3,984,891 A * | 10/1976 | Weinmann | ....................... | 14/69.5 |
| 4,039,163 A * | 8/1977 | Shorey | ........................ | 244/137.1 |
| 4,235,399 A * | 11/1980 | Shorey | ........................ | 244/137.1 |
| 4,517,698 A * | 5/1985 | Lamp'l et al. | ................... | 14/72.5 |
| 5,184,366 A * | 2/1993 | Rawdon et al. | ................ | 14/71.5 |
| 5,241,722 A * | 9/1993 | Rohrlick et al. | ............... | 14/71.5 |
| 6,526,614 B2 * | 3/2003 | Anderson et al. | .............. | 14/69.5 |
| 6,536,064 B1 * | 3/2003 | Swink et al. | .................... | 14/69.5 |
| 7,930,788 B1 | 4/2011 | Beilstein | | |
| 7,976,264 B1 * | 7/2011 | Pope | ............................. | 414/480 |
| 8,215,581 B1 * | 7/2012 | Kulesha | ...................... | 244/118.3 |

OTHER PUBLICATIONS

A photograph of a semi-trailer truck being loaded on to a C-5 military cargo airplane with a stacked wooden board ramp system, Dec. 2012.

\* cited by examiner

*Primary Examiner* — Raymond W Addie
(74) *Attorney, Agent, or Firm* — Donald J. Ersler

(57) ABSTRACT

A ramp system for a C-130 cargo airplane preferably includes a lead ramp, a ramp pad, a plurality of ramps and a plurality of ramp stands. A second embodiment of a ramp system for a C-130 cargo airplane preferably includes a plurality of wedges, a plurality of ramp pads, the plurality of ramps and the plurality of ramp stands. A ramp system for a C-5 or C-17 cargo airplane preferably includes the plurality of wedges, the plurality of ramp pads, the plurality of ramps and one ramp stand.

20 Claims, 14 Drawing Sheets

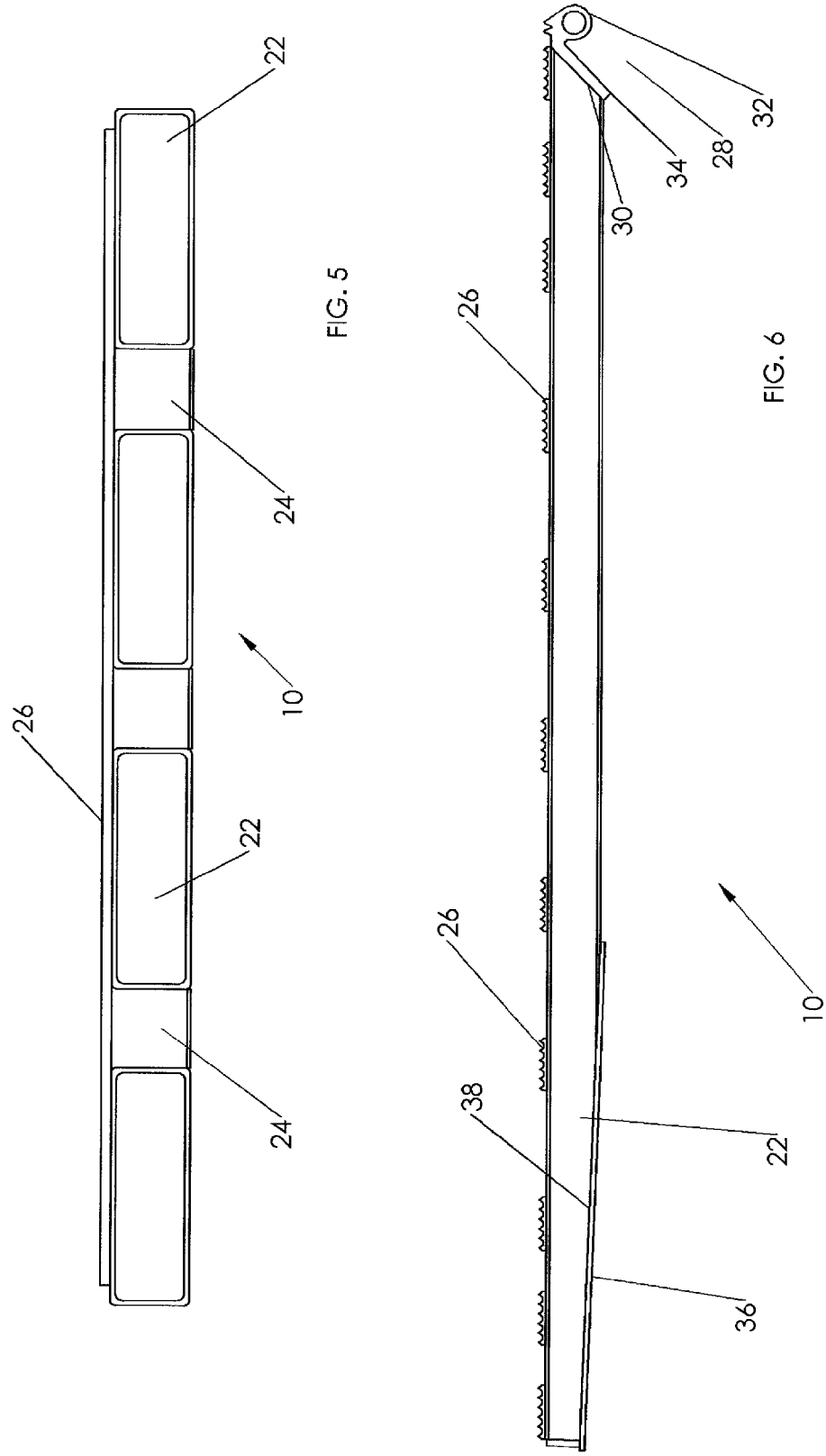

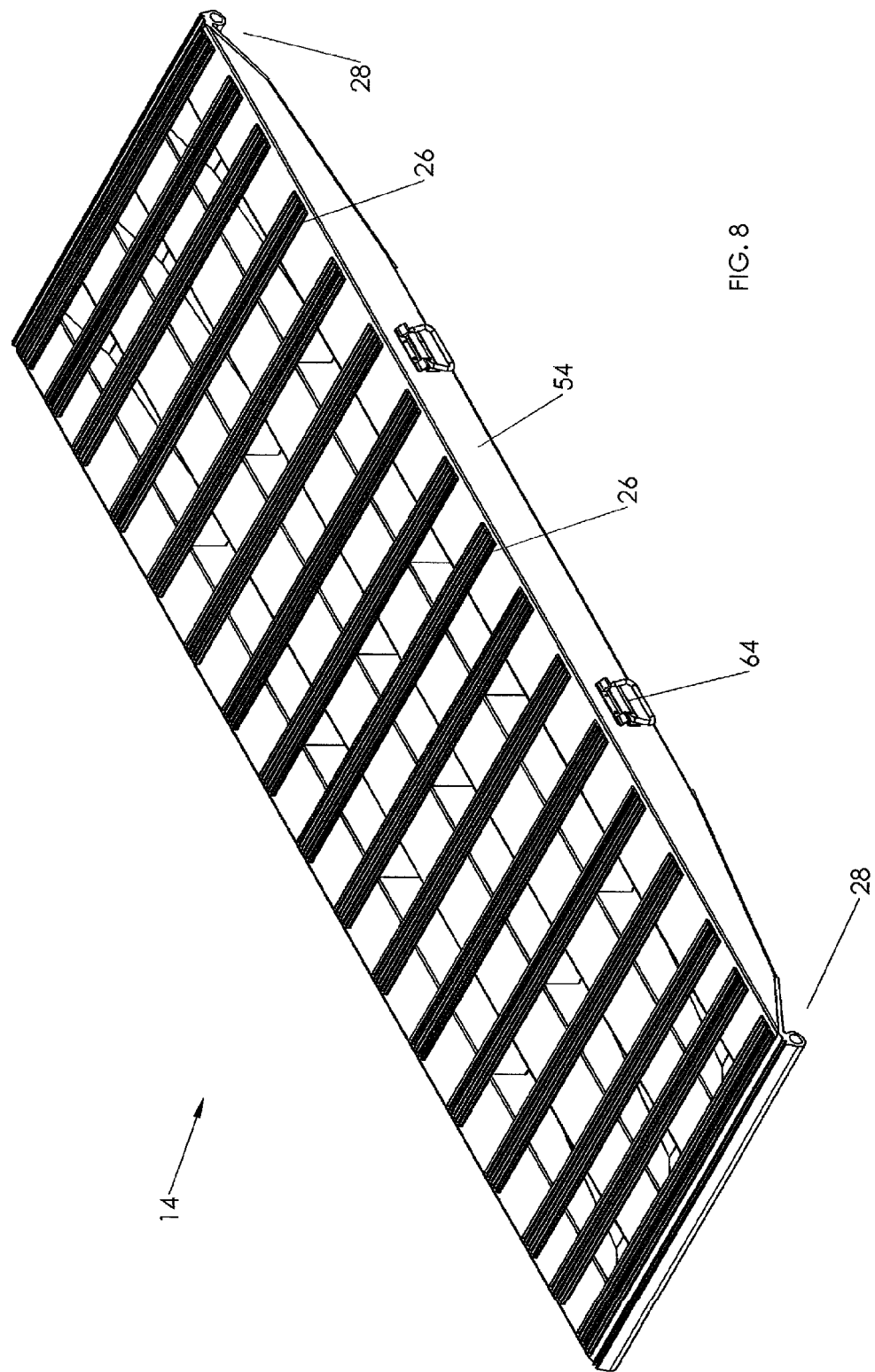

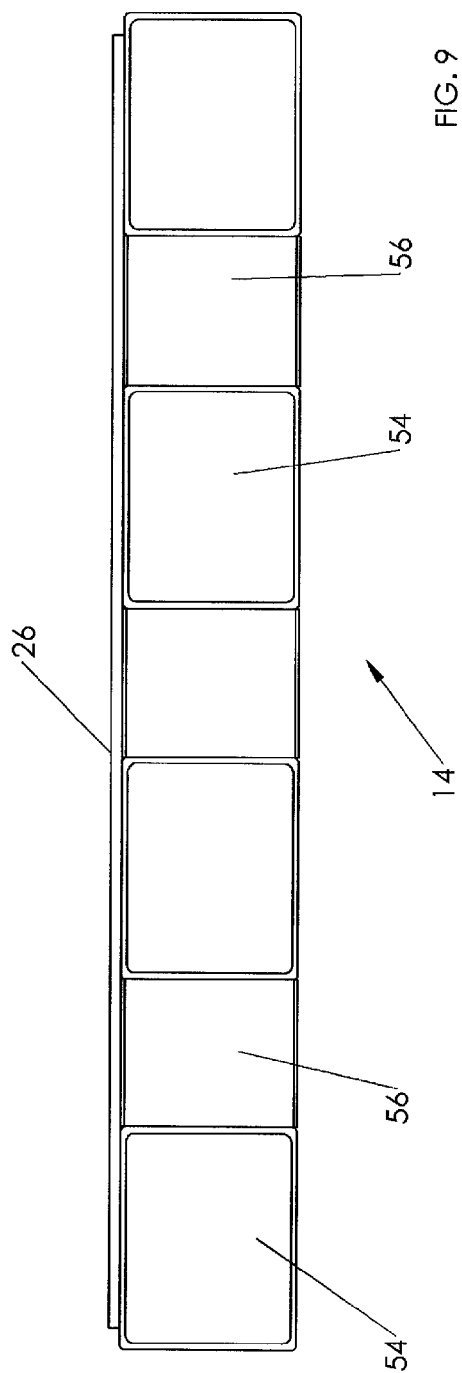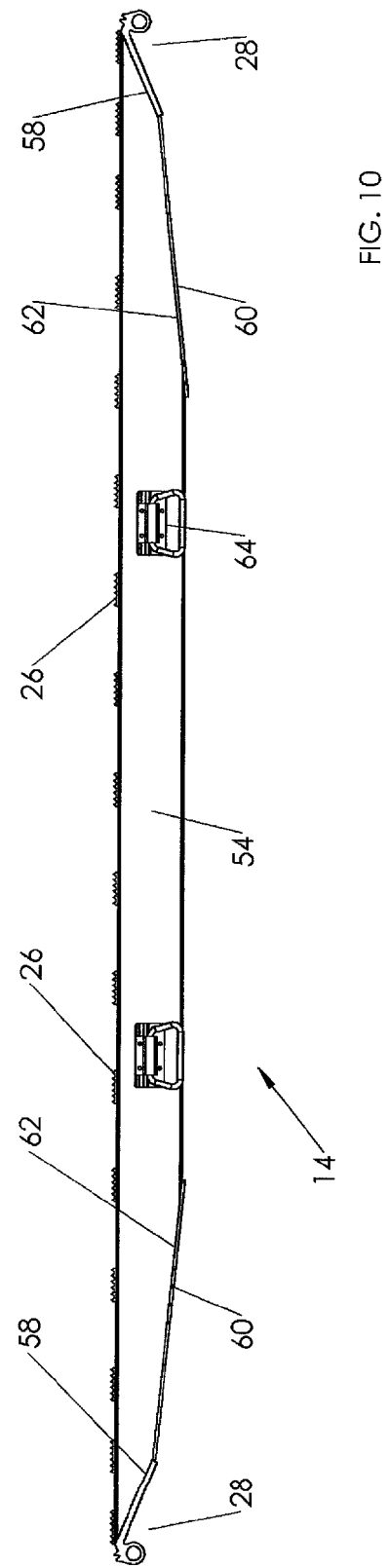

RAMP SYSTEM FOR CARGO AIRPLANES

CROSS-REFERENCES TO RELATED APPLICATIONS

This is a continuation-in-part patent application taking priority from patent application Ser. No. 13/541,699 filed on Jul. 4, 2012.

BACKGROUND OF THE INVENTION

1. Field of the Invention

The present invention relates generally to loading ramps and more specifically to a ramp system for cargo airplanes, which allows a cargo airplane to be loaded in an efficient manner.

2. Discussion of the Prior Art

U.S. Pat. No. 7,930,788 to Beilstein discloses a reduced height combination ramp and load leveler. Ramps for loading trucks and trailers are well known in the art. The Air Transportability Test Loading Activity (ATTLA) regulations require that contact with an airplane tarmac or a military cargo airplane cannot exceed 50 psi. The ATTLA regulations also require that a ramp system must support at least 10,000 lbs and that metal to metal contact cannot occur between a ramp component and the military cargo airplane. It appears that the only prior art for loading non-military vehicles on to a C-5 military cargo utilizes a plurality of stacked wood boards as illustrated in a photograph submitted with the attached information disclosure statement. However, other than the above ramp system, it appears that the prior art does not disclose a ramp system for loading military cargo airplanes, such as the C-130, C-17 and C-5.

Accordingly, there is a clearly felt need in the art for a ramp system for a cargo plane, which includes a relatively light weight ramp system and allows a cargo plane to be loaded in an efficient manner.

SUMMARY OF THE INVENTION

The present invention provides a ramp system for a cargo plane, which includes a relatively light weight ramp system. A ramp system for a cargo airplane (C-130 ramp system) preferably includes a lead ramp, a ramp pad, a plurality of ramps and a plurality of ramp stands. The lead ramp includes a plurality of lead lengthwise tubes, a plurality of lead bridge members, a plurality of lead cleats and a hook end. The plurality of lead cleats are attached to a top of the plurality of lead lengthwise tubes. The plurality of lead bridge members are inserted and attached between adjacent lead lengthwise tubes. One end of the plurality of lower lengthwise tubes is mitered for attachment of the hook end. The ramp pad preferably includes a base and a cross member retainer. The cross member retainer includes a cross member, a plurality of lock tubes, a pair of end plates and a pair of lock rods. Each ramp includes a plurality of lengthwise tubes, a plurality of bridge members, a plurality of cleats and two hook ends. The plurality of cleats are attached to a top of the plurality of lengthwise tubes. The plurality of bridge members are inserted and attached between adjacent lengthwise tubes. Each end of the plurality of lengthwise tubes are mitered for attachment of the hook ends.

Each ramp stand includes a support platform and an adjustable tube receiver. The support platform includes two receiver members and the removable cross member. One end of the removable cross member is removably retained by one of the two receiver members and the other end of the removable cross member is removably retained by the other one of the two receiver members. The adjustable tube receiver includes a cross member retainer and two tube extensions. The two tube extensions extend downward from each end of the cross member retainer. The two locking rods are inserted through the lock tubes to retain hook ends of the ramps. The tube extensions are sized and located to be received by the two receiver members. The tube extension preferably includes a plurality of holes for adjusting the height thereof relative to the receiver member by insertion of a level pin.

A second embodiment of a C-130 ramp system includes a plurality of wedges, a plurality of ramp pads, the plurality of ramps and the plurality of ramp stands. A C-5 or C-17 ramp system includes the plurality of wedges, the plurality of ramp pads, the plurality of ramps and the ramp stand.

The C-130 ramp system is preferably used in the following manner for a C-130 military cargo airplane. One end of lead ramp is retained by one side of the ramp pad and the other end is laid on an airfield tarmac. One end of a first ramp is placed in the other side of the ramp pad and the other end is retained by a first side of a first ramp stand. One end of a second ramp is placed in the other side of the first ramp stand and the other end of the second ramp is retained by one side of the second ramp stand. One end of a third ramp is retained by the other side of the second ramp stand and the other end of the third ramp is retained by a third ramp stand.

The second embodiment of the C-130 ramp system is preferably used in the following manner for the C-130 military cargo airplane. One end of a first wedge is retained by one side of a first ramp pad and the other end of the first wedge is laid on an airfield tarmac. One end of a first ramp is retained by the other side of the ramp pad and the other end of the first ramp is retained by one side of a first ramp stand. One end of a second ramp is retained by the other end of the first ramp stand and the other end of the second ramp is retained by one side of a second ramp stand. One end of a third ramp is retained by the other side of the second ramp stand and the other end of the third ramp is retained by one side of a second ramp pad. One end of a second wedge is retained by the other side of the second ramp pad and the other end of the second wedge is laid on a cargo door of the C-130.

The C-5 or C-17 ramp system is preferably used in the following manner for the C-5 and C-17 military cargo airplanes. One end of a first wedge is retained in one side of a first ramp pad and the other end of the first wedge is laid on an airfield tarmac. One end of a first ramp is retained by the other side of the first ramp pad and the other end of the first ramp retained by one side of a first ramp stand. One end of a second ramp is retained by the other end of the first ramp stand and the other end of the second ramp is retained by one end of a second ramp pad. One end of a second wedge is retained by the other end of the second ramp pad and the other end of the second wedge is laid on a cargo door of the C-5 or C-17.

Accordingly, it is an object of the present invention to provide a ramp system, which includes a relatively light weight ramp system.

Finally, it is another object of the present invention to provide a ramp system, which allows a cargo airplane to be loaded in an efficient manner.

These and additional objects, advantages, features and benefits of the present invention will become apparent from the following specification.

BRIEF DESCRIPTION OF THE DRAWINGS

FIG. 5 is a cross sectional view of a lead ramp of a C-130 ramp system in accordance with the present invention.

FIG. 6 is a side view of a lead ramp of a C-130 ramp system in accordance with the present invention.

FIG. 8 is a perspective view of a ramp of a C-130 ramp system in accordance with the present invention.

FIG. 9 is a cross sectional view of a ramp of a C-130 ramp system in accordance with the present invention.

FIG. 10 is a side view of a ramp of a C-130 ramp system in accordance with the present invention.

DETAILED DESCRIPTION OF THE PREFERRED EMBODIMENTS

Figure 1:
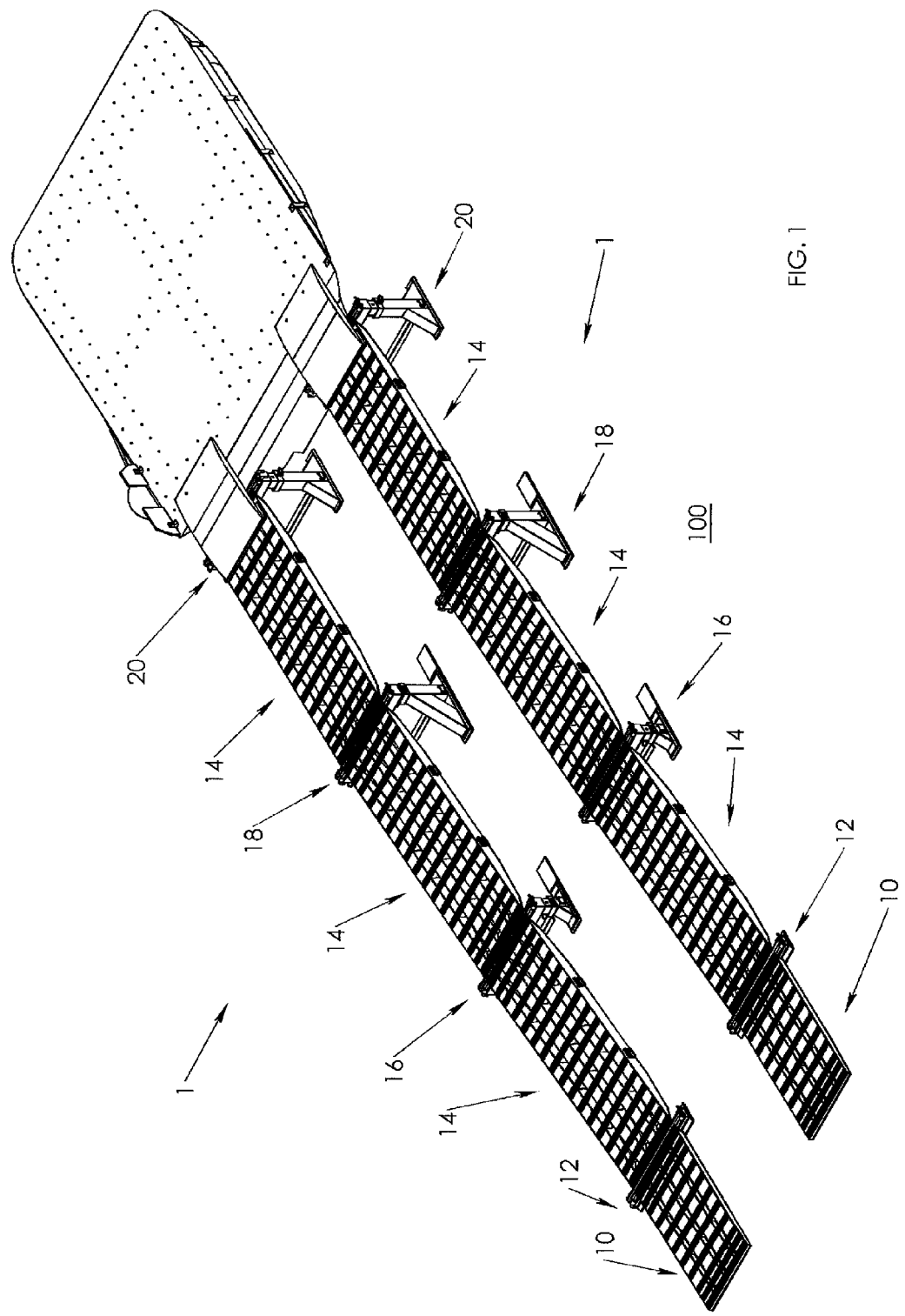
FIG. 1 is a perspective view of a C-130 ramp system for a C-130 cargo airplane in accordance with the present invention.
Figure 4:
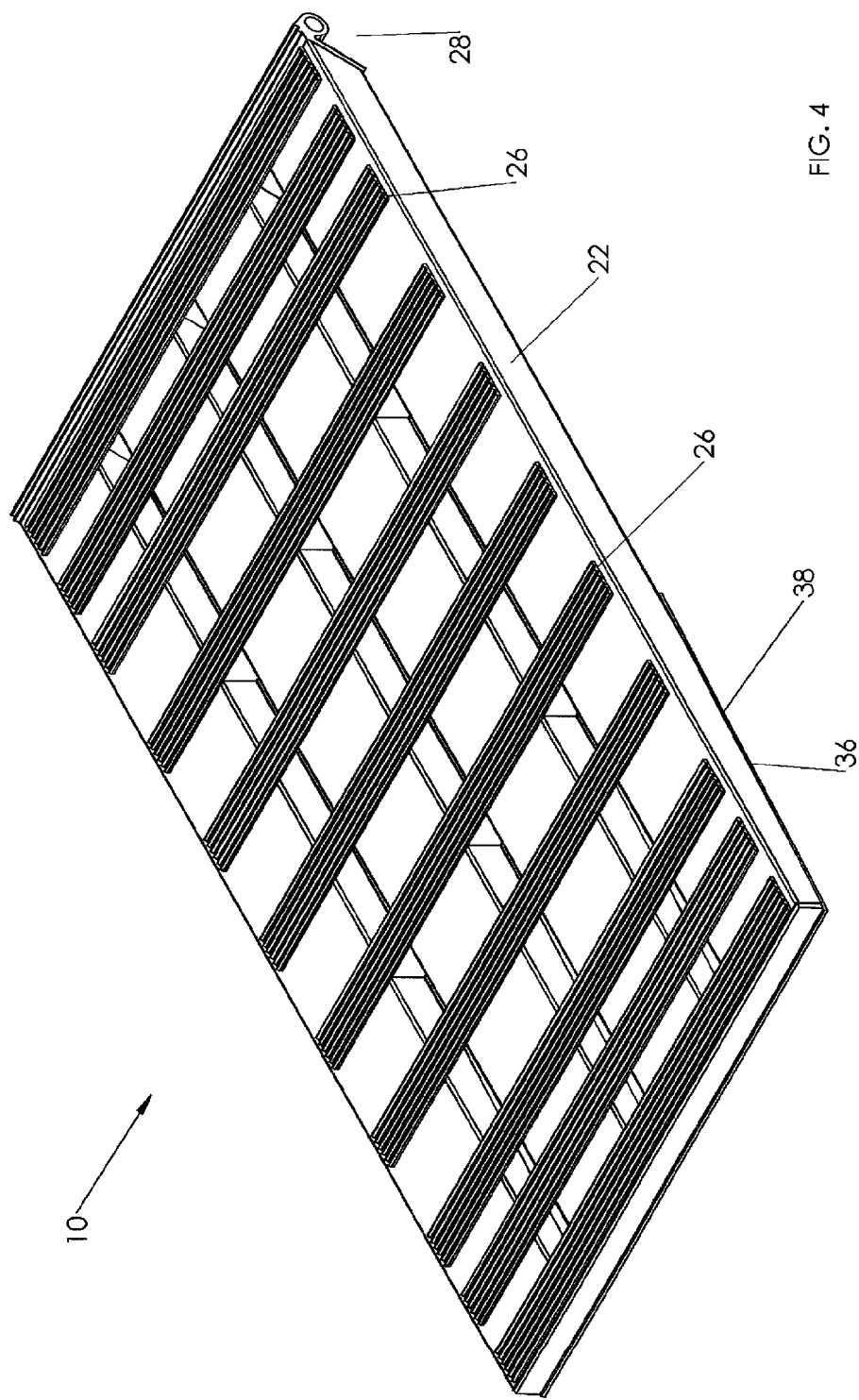
FIG. 4 is a perspective view of a lead ramp of a C-130 ramp system in accordance with the present invention.

With reference now to the drawings, and particularly to FIG. 1, there is shown a C-130 ramp system 1 for a C-130 cargo airplane. The C-130 ramp system 1 preferably includes a lead ramp 10, a ramp pad 12, a plurality of ramps 14, a first ramp stand 16, a second ramp stand 18 and a third ramp stand 20. With reference to FIGS. 4-6, the lead ramp 10 includes a plurality of lead lengthwise tubes 22, a plurality of lead bridge members 24, a plurality of lead cleats 26 and a hook end 28. The plurality of lead bridge members 24 are inserted and attached between adjacent lead lengthwise tubes 22 with welding or the like. The plurality of cleats 26 are attached to a top of the plurality of lead lengthwise tubes 22. A mitered surface 30 is created on one end of the plurality of lead lengthwise tubes 22 for attachment of the hook end 28. The hook end 28 includes a tubular member 32 and a plate member 34, which extends from the tubular member 32. The hook end 28 is preferably formed as an aluminum extrusion. An angled surface 38 is preferably formed on the other end of the plurality of lead lengthwise tubes 22. A foot plate 36 is attached to the angled surface 38 with welding or the like. It is preferable that the plurality of lead lengthwise tubes 22 be fabricated from an aluminum material having a minimum tensile strength of 45,000 psi.

Figure 7:
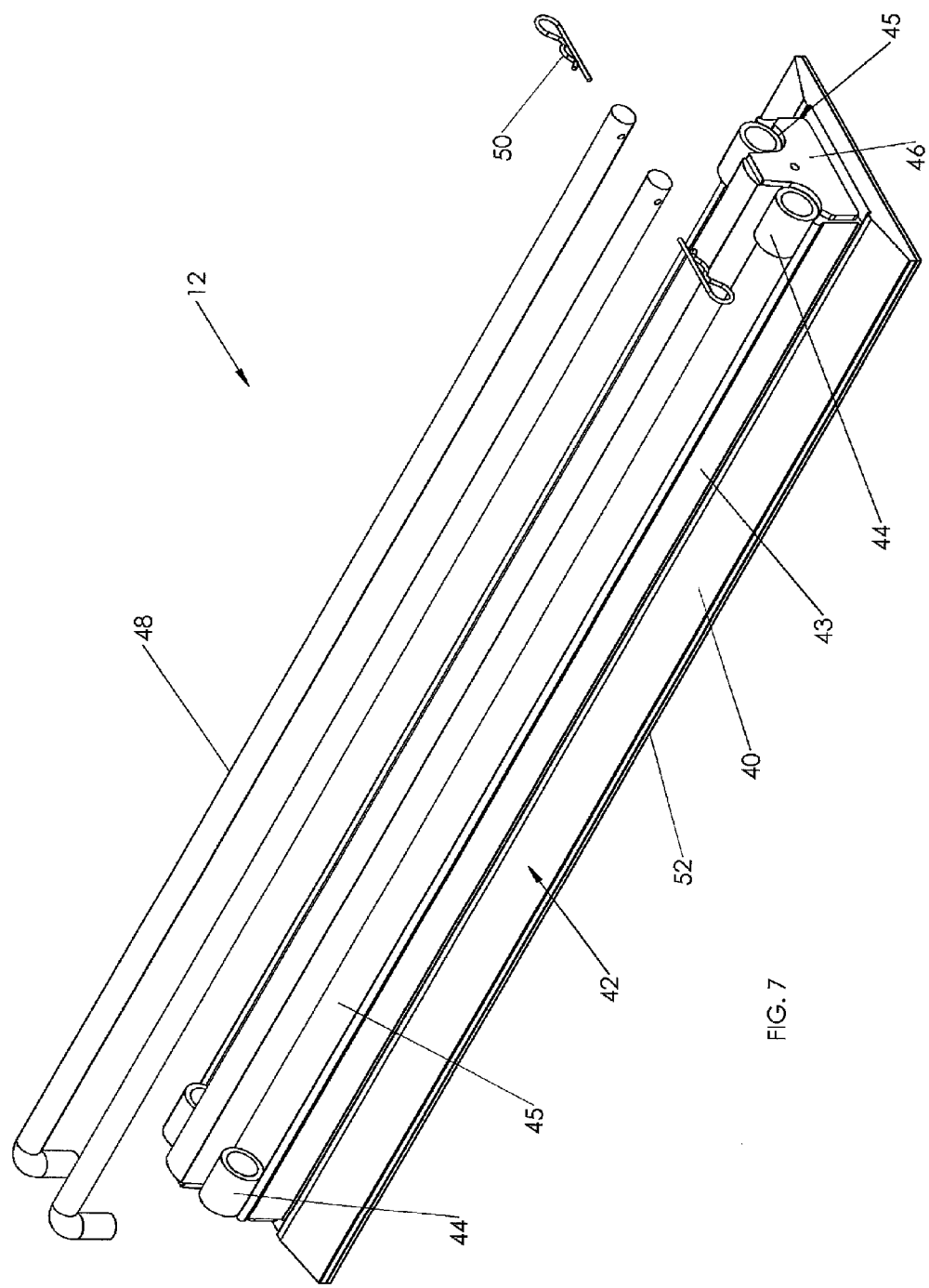
FIG. 7 is a partially exploded perspective view of a ramp pad of a C-130 ramp system in accordance with the present invention.

With reference to FIG. 7, the ramp pad 12 preferably includes a support base 40 and a cross member retainer 42.

The cross member retainer 42 includes a cross member 43, a plurality of lock tubes 44, a pair of end plates 46 and a pair of lock rods 48. The cross member 43 is attached to the support base 40 with welding or the like. The support base 40 is preferably fabricated from a material having a yield strength of at least 45,000 psi. The support base 40 provides the necessary weight distribution to meet the ATTLA 50 psi requirement. The cross member 43 is preferably a tubular T-shaped extrusion. Each end plate 46 includes a substantial T-shape. Two adjacent semi-circular grooves 45 are formed across a length of the cross member 43 to each receive the tubular member 32 of the hook end 28. A lock tube 44 is attached in each end of the semi-circular groove 44 with welding or the like. A single end plate 46 is attached to each end of the cross member 43. Each lock rod 48 is inserted through a first lock tube 44 on one end of the ramp pad 12, the hook end 28 and a second lock tube 44 on the other end of the ramp pad 12. Each lock rod 48 is preferably axially retained with a pin 50. A nonmetal pad 52 is attached to a bottom of the support base 40 to prevent metal to metal contact with a cargo airplane door 102, 104.

With reference to FIGS. 8-10, the ramp 14 includes a plurality of lengthwise tubes 54, a plurality of bridge members 56, the plurality of cleats 26 and two hook ends 28. The ramp 14 is preferably symmetrical to reduce assembly time. The plurality of bridge members 56 are inserted and attached between adjacent lengthwise tubes 54 with welding or the like. The plurality of cleats 26 are attached to a top of the plurality of lengthwise tubes 54. A mitered surface 58 is created on each end of the plurality of lengthwise tubes 54 for attachment of the hook ends 28. A foot plate 60 is preferably attached to a bottom of an angled surface 62 formed adjacent each mitered surface 58. It is preferable that the plurality of lengthwise tubes 22 be fabricated from an aluminum material having a minimum tensile strength of 45,000 psi. It is preferably to attach handles 64 to an outside lengthwise tube 54.

Figure 11:
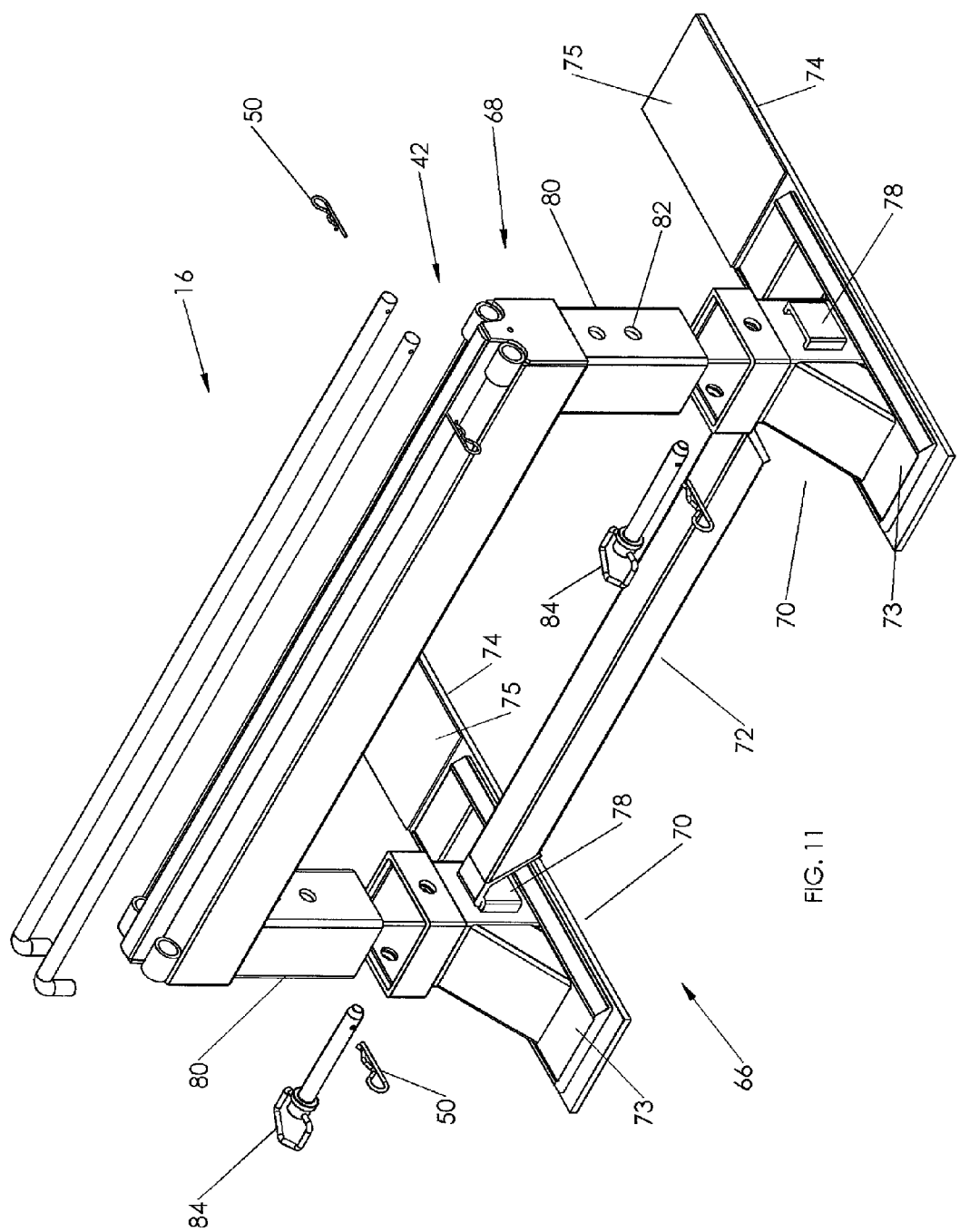
FIG. 11 is a partially exploded perspective view of a first ramp stand of a C-130 ramp system in accordance with the present invention.
Figure 12:
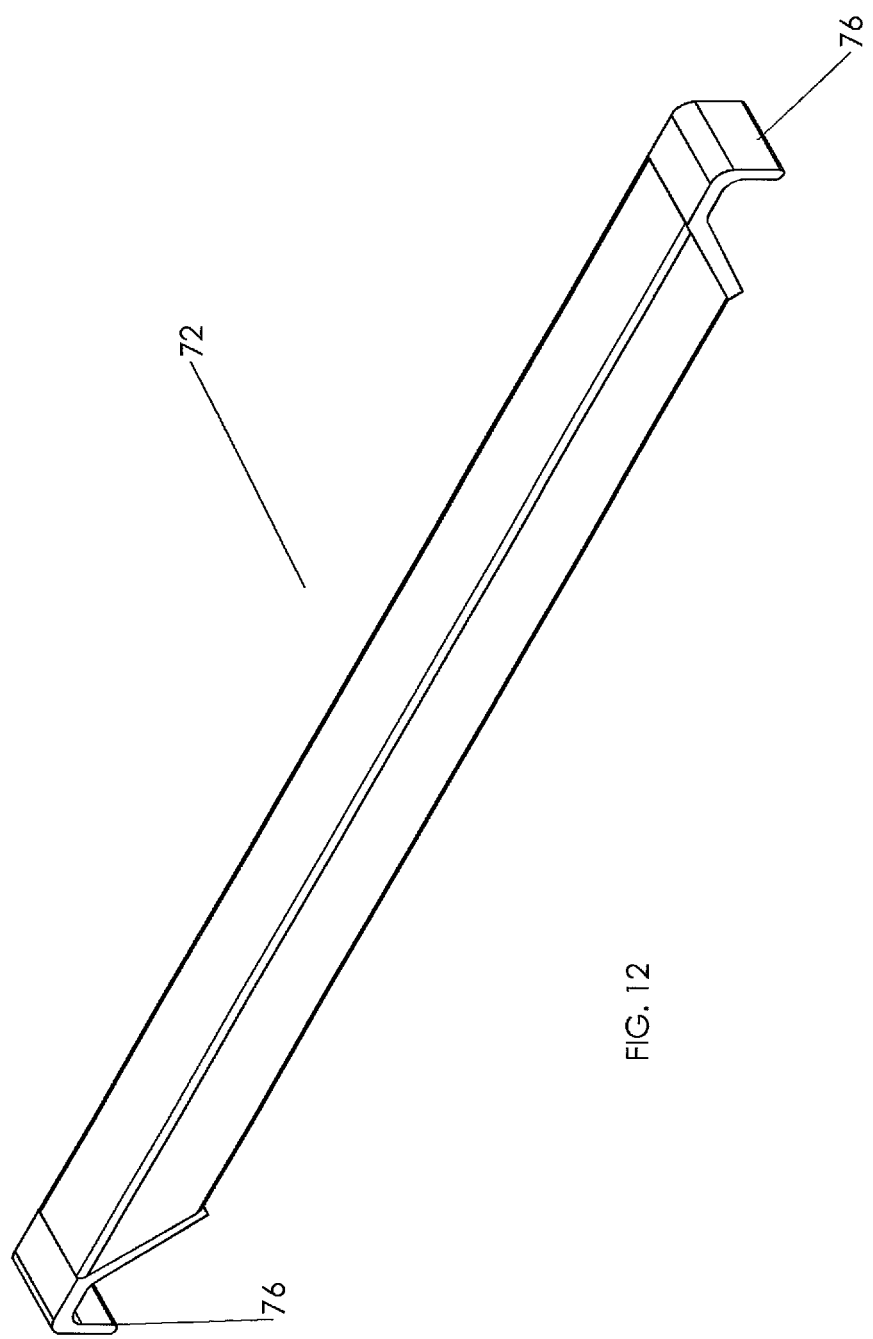
FIG. 12 is a perspective view of a removable cross member of a C-130 ramp system in accordance with the present invention.

With reference to FIGS. 11-12, the first ramp stand 16 includes a support platform 66 and an adjustable tube receiver 68. The support platform 66 includes two receiver members 70, a removable cross member 72, two support bases 73 and two base flanges 74. The receiver members 70 are preferably identical to each other to reduce assembly time. Each receiver member 70 is attached to a top of the support base 73. The support base 73 is preferably fabricated from a material having a yield strength of at least 45,000 psi. The support base 73 provides the necessary weight distribution to meet the ATTLA 50 psi requirement. The base flange 74 is attached to a bottom of the support base 73. A nonmetal pad 75 is attached to a bottom of the support base 73 to prevent metal to metal contact with a cargo airplane door 102, 104. The removable cross member 72 includes a vertical tongue 76 extending downward from each end thereof. A tongue bracket 78 is attached to opposing sides of each receiver member 70. The tongue bracket 78 includes a tongue slot, which is sized to firmly receive the vertical tongue 76 of the removable cross member 72. The vertical tongue 76 on one end of the removable cross member 72 is inserted into the tongue bracket 78 of one receiver member 70 and the vertical tongue 76 on the other end of the removable cross member 72 is inserted into the tongue bracket 78 of the other receiver member 70.

The adjustable tube receiver 68 includes the cross member retainer 42 and two tube extensions 80. The two tube extensions 80 extend downward from each end of the cross member retainer 42. The tube extensions 80 are sized and located to be received by the two receiver members 70. The tube extension 80 preferably includes a plurality of holes 82 for adjusting the height thereof relative to the receiver member 70 by insertion of a level pin 84.

Figure 13:
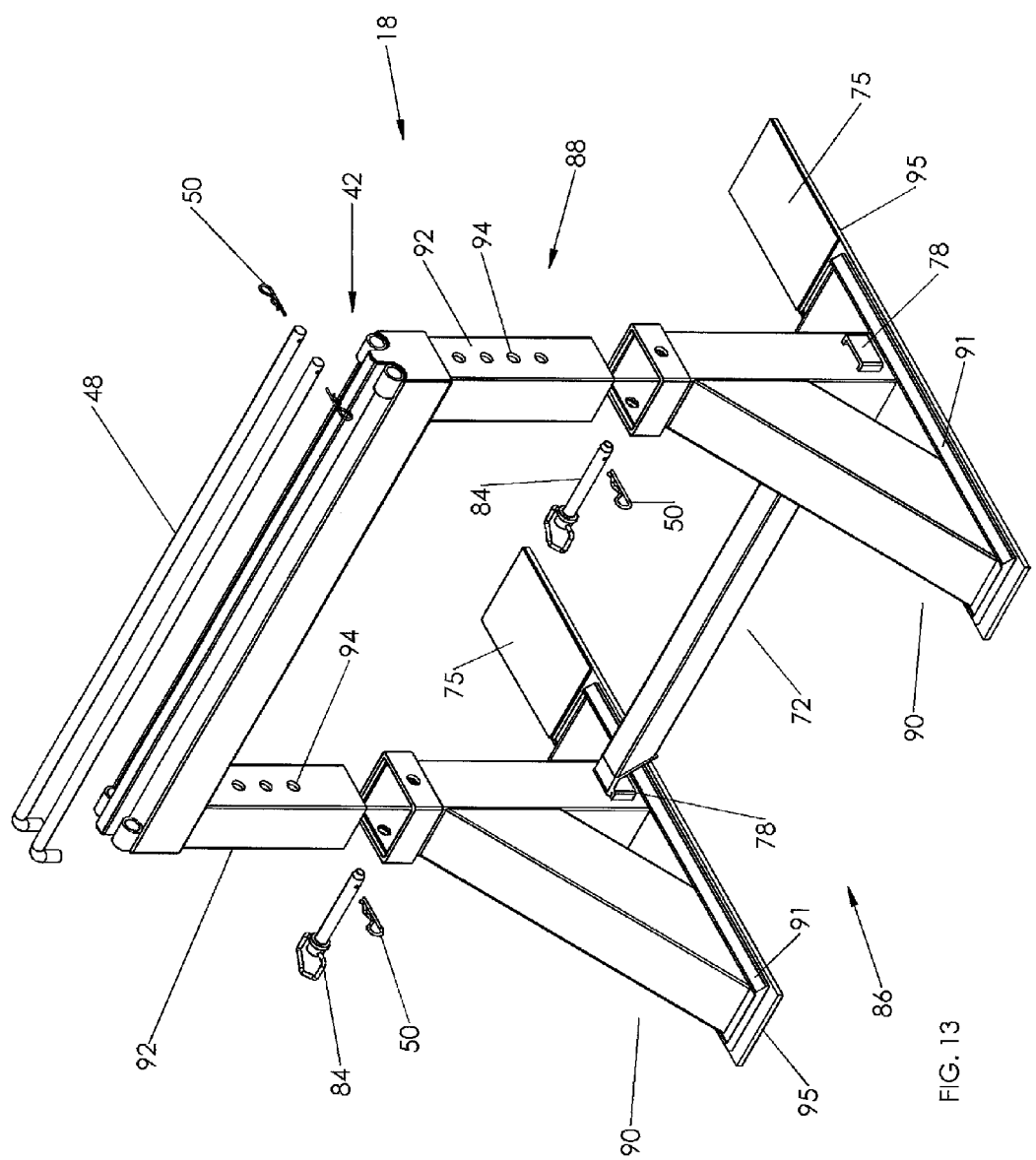
FIG. 13 is a partially exploded perspective view of a second ramp stand of a C-130 ramp system in accordance with the present invention.

With reference to FIG. 13, the second ramp stand 18 includes a support platform 86 and an adjustable tube receiver 88. The support platform 86 includes two receiver members 90, the removable cross member 72, two support bases 91 and the two base flanges 95. The receiver members 90 are preferably identical to each other to reduce assembly time. Each receiver member 90 is attached to the support base 91 with welding or the like. The support base 91 is preferably fabricated from a material having a yield strength of at least 45,000 psi. The support base 91 provides the necessary weight distribution to meet the ATTLA 50 psi requirement. A nonmetal pad 75 is attached to a bottom of the support base 91 to prevent metal to metal contact with a cargo airplane door 102, 104. The base flange 95 is attached to a bottom of the support member 91. The tongue bracket 78 is attached to opposing sides of each receiver member 90. The vertical tongue 76 on one end of the removable cross member 72 is inserted into the tongue bracket 78 of one receiver member 90 and the vertical tongue 76 on the other end of the removable cross member 72 is inserted into the tongue bracket 78 of the other receiver member 90.

The adjustable tube receiver 88 includes the cross member retainer 42 and two tube extensions 92. The two tube extensions 92 extend downward from each end of the cross member retainer 42. The tube extensions 92 are sized and located to be received by the two receiver members 90. The tube extension 92 preferably includes a plurality of holes 94 for adjusting the height thereof relative to the receiver member 90 by insertion of the level pin 84.

Figure 14:
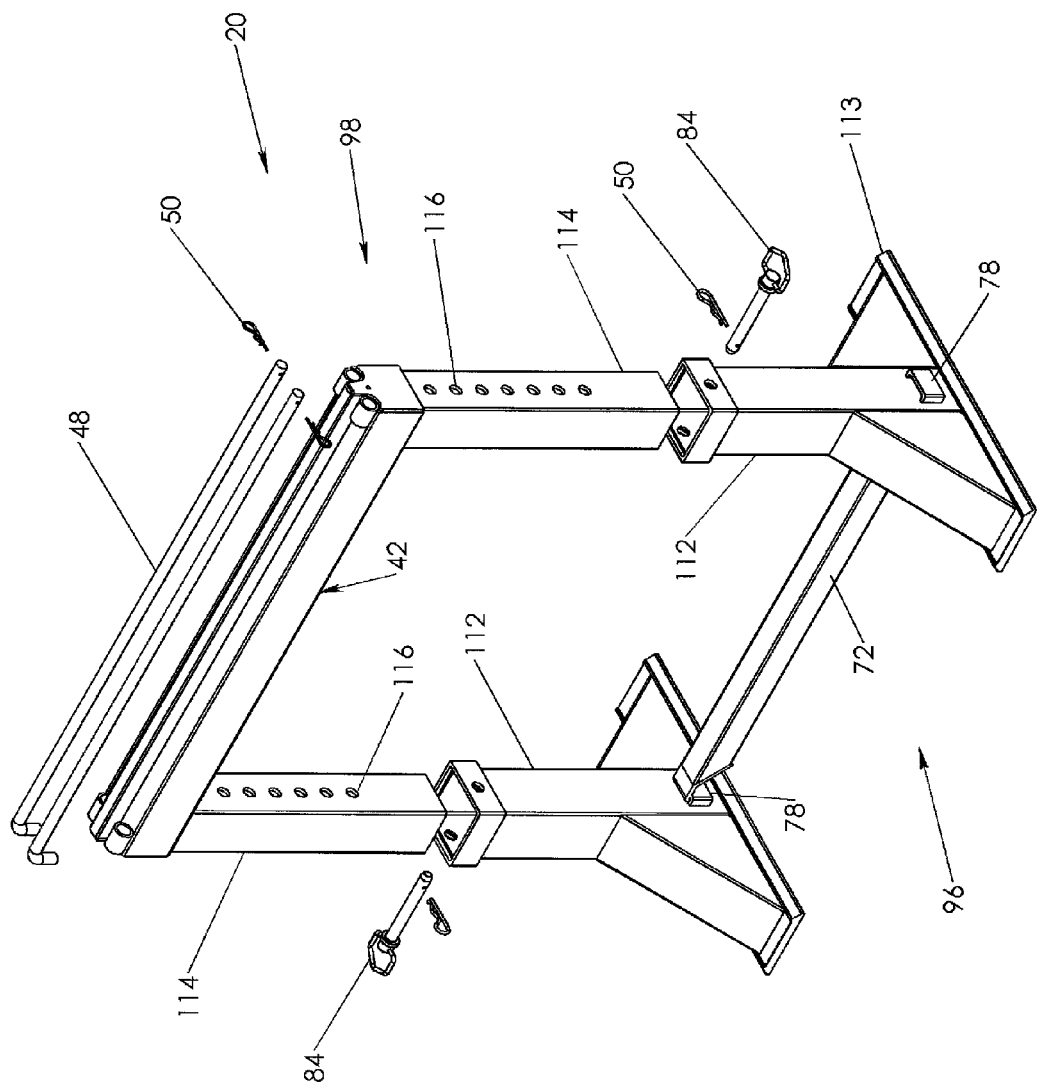
FIG. 14 is a perspective view of a third ramp stand of a C-130 ramp system in accordance with the present invention.

With reference to FIG. 14, the third ramp stand 20 includes a support platform 96 and an adjustable tube receiver 98. The support platform 96 includes two receiver members 112, the removable cross member 72 and the two support bases 113. The receiver members 112 are preferably identical to each other to reduce assembly time. The support base 113 is attached to a bottom of the receiver member 112. The support base 113 is preferably fabricated from a material having a yield strength of at least 45,000 psi. The support base 113 provides the necessary weight distribution to meet the ATTLA 50 psi requirement. The tongue bracket 78 is attached to opposing sides of each receiver member 112. The vertical tongue 76 on one end of the removable cross member 72 is inserted into the tongue bracket 78 of one receiver member 112 and the vertical tongue 76 on the other end of the removable cross member 72 is inserted into the tongue bracket 78 of the other receiver member 112.

The adjustable tube receiver 98 includes the cross member retainer 42 and two tube extensions 114. The two tube extensions 114 extend downward from each end of the cross member retainer 42. The tube extensions 114 are sized and located to be received by the two receiver members 112. The tube extension 114 preferably includes a plurality of holes 116 for adjusting the height thereof relative to the receiver member 112 by insertion of the level pin 84.

Figure 2:
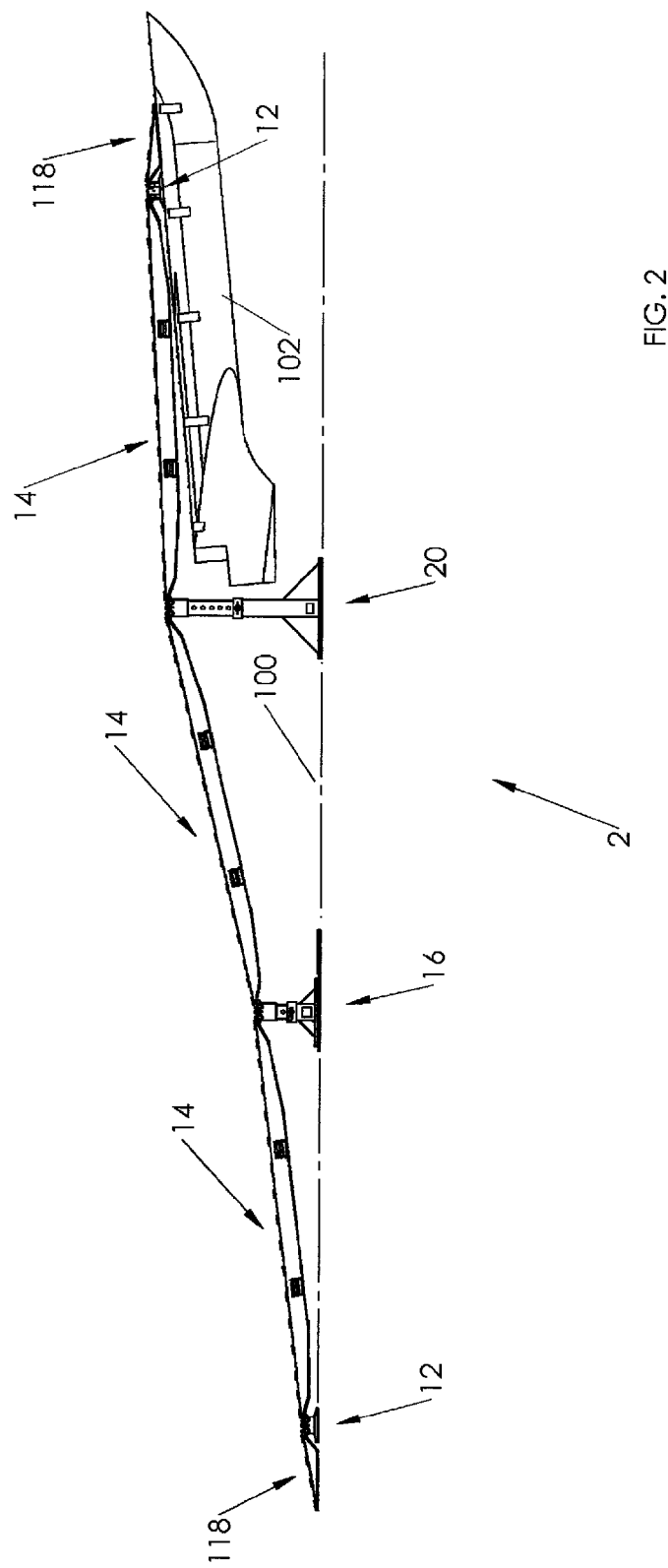
FIG. 2 is a side view of a second embodiment of a C-130 ramp system for a C-130 cargo airplane in accordance with the present invention.
Figure 15:
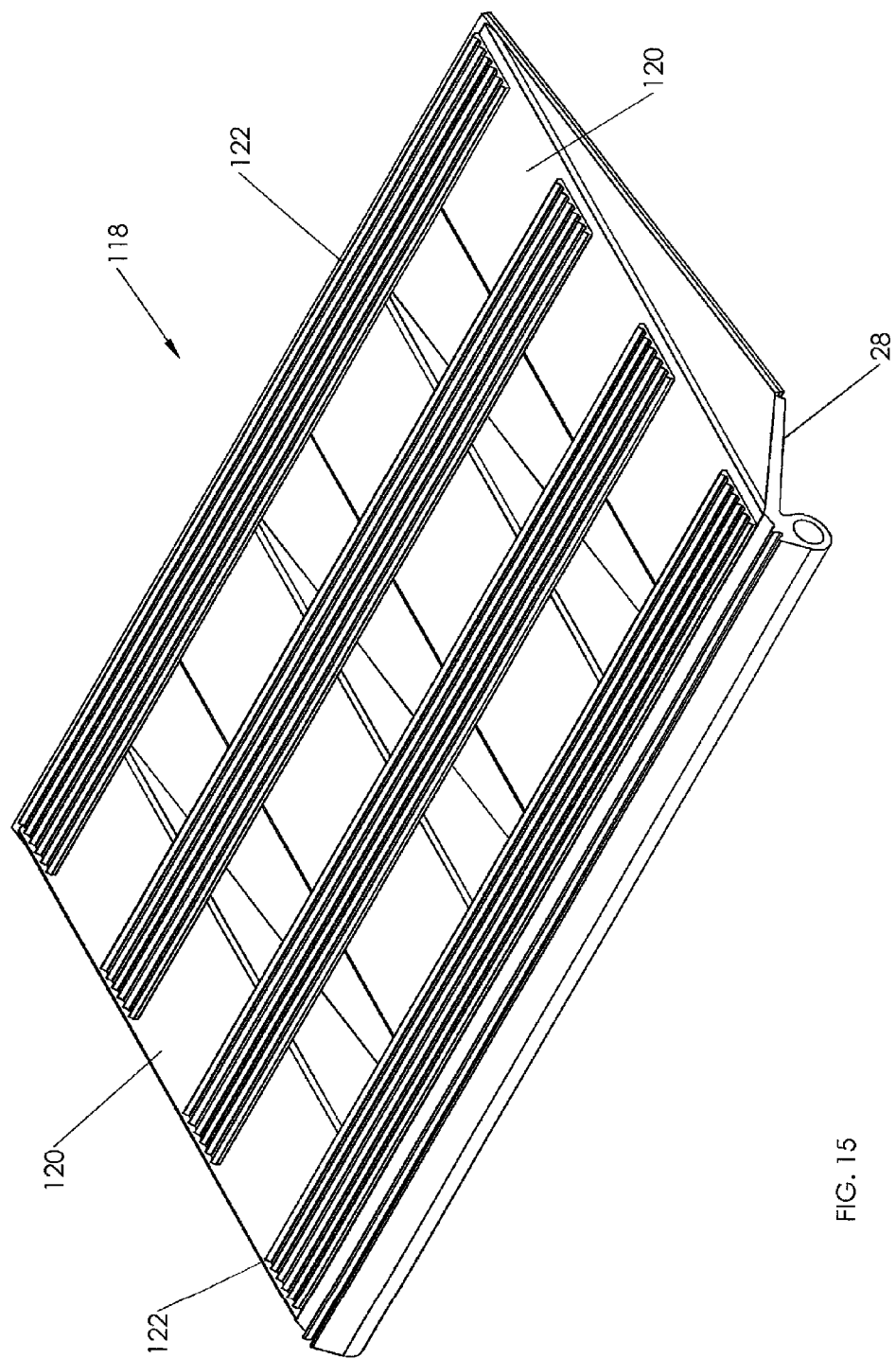
FIG. 15 is a perspective view of a wedge of a second embodiment of a C-130 ramp system in accordance with the present invention.
Figure 16:
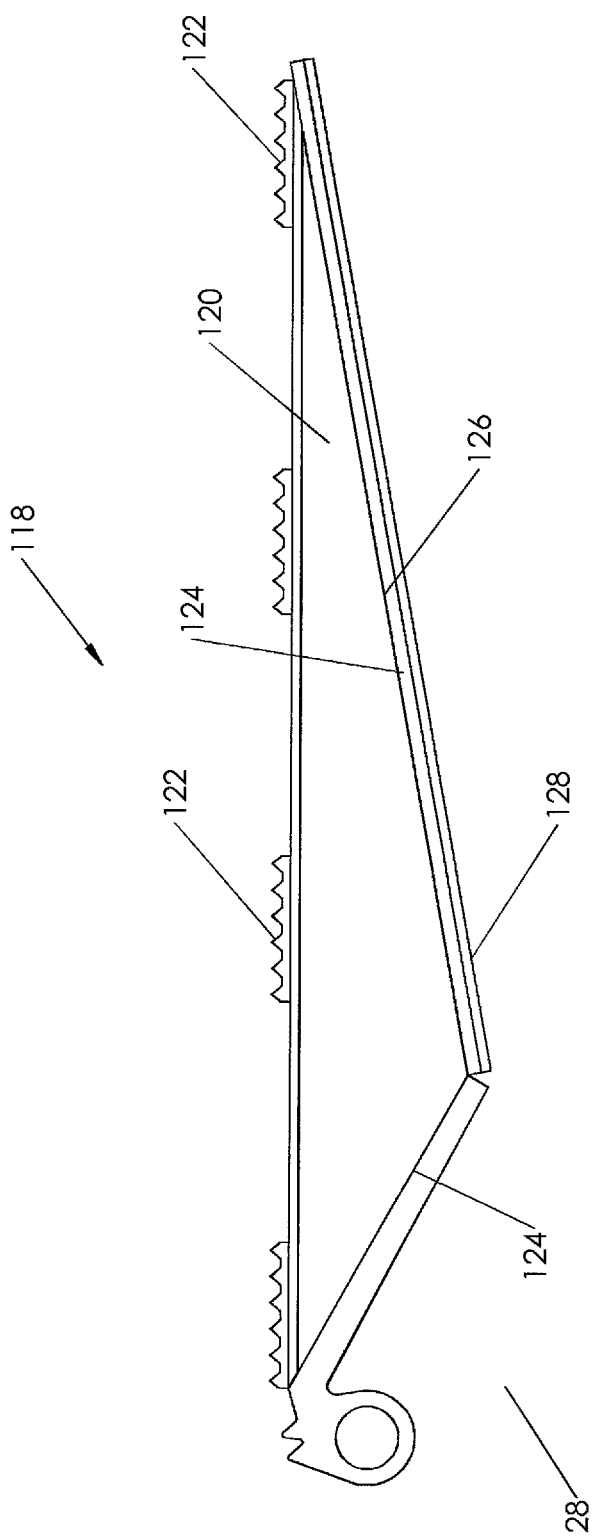
FIG. 16 is a side view of a wedge of a second embodiment of a C-130 ramp system in accordance with the present invention.

With reference to FIGS. 2, 15 and 16, a second embodiment of a C-130 ramp system 2 includes a plurality of wedges 118, the plurality of ramp pads 12, the plurality of ramps 14 and the ramp stands 16, 20. Each wedge 118 includes a plurality of wedge lengthwise tubes 120, a plurality of wedge cleats 122 and the hook end 28. The plurality of cleats 122 are attached to a top of the plurality of wedge lengthwise tubes 120. A mitered surface 124 is created on one end of the plurality of lead lengthwise tubes 120 for attachment of the hook end 28. An angled surface 126 is formed on a bottom of the plurality of lengthwise wedge tubes 120. A wedge foot plate 124 is attached to the angled surface 126 with welding or the like. A nonmetal pad 128 is preferably attached to a bottom of the wedge foot plate 124 to prevent potential metal to metal contact with a cargo airplane door 102, 104.

Figure 3:
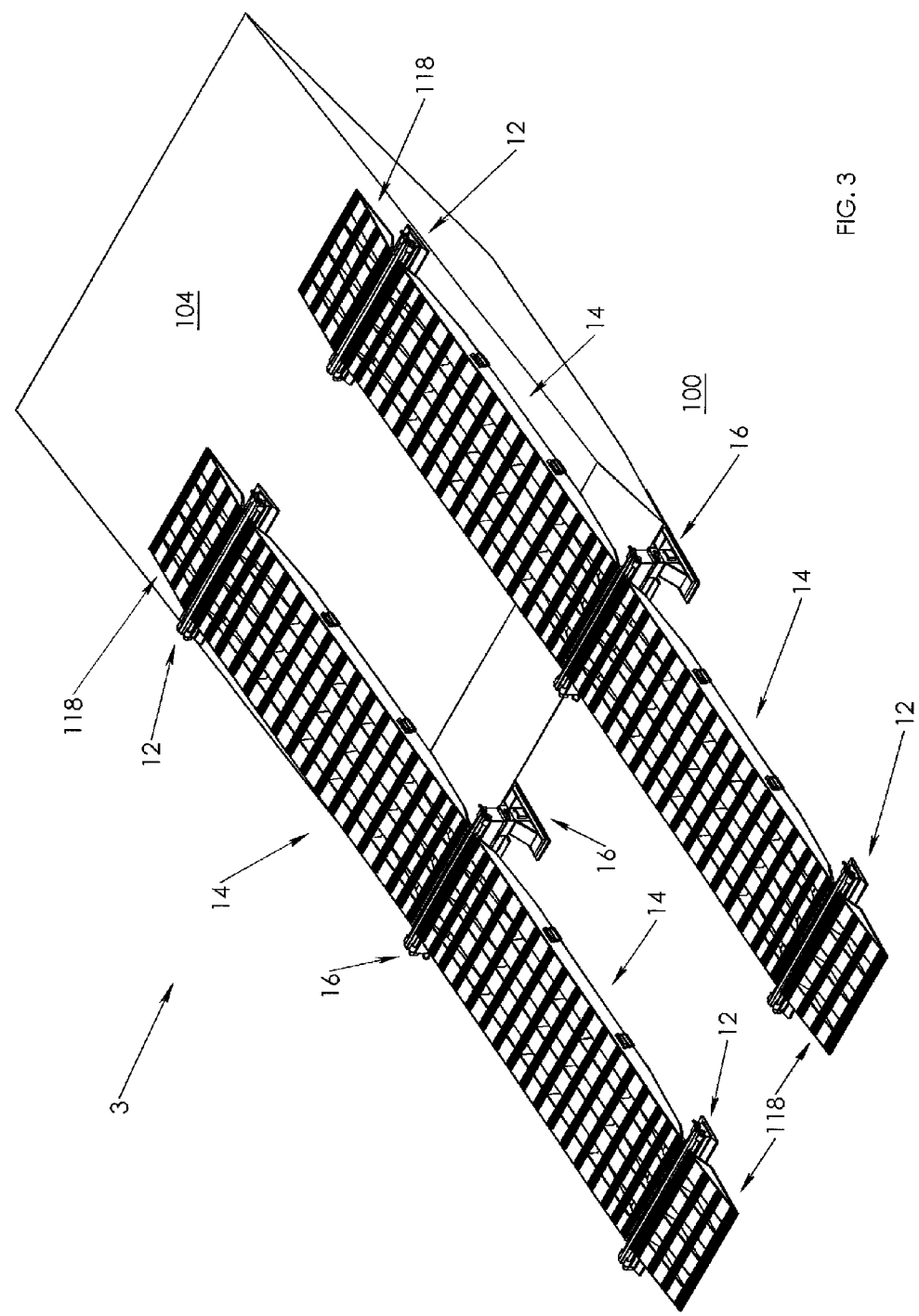
FIG. 3 is a perspective view of a C-5 or C-17 ramp system for a C-5 or C-17 cargo airplane in accordance with the present invention.

With reference to FIG. 3, a C-5 or C-17 ramp system 3 includes the plurality of wedges 118, the plurality of ramp pads 12, the plurality of ramps 14 and the ramp stand 16.

With reference to FIG. 1, the C-130 ramp system 1 is preferably used in the following manner for a C-130 military cargo airplane. One end of lead ramp 10 is retained by one side of the ramp pad 12 and the other end is laid on an airfield tarmac 100. One end of a first ramp 14 is placed in the other side of the ramp pad 12 and the other end is retained by a first side of a first ramp stand 16. One end of a second ramp 14 is placed in the other side of the first ramp stand 16 and the other end of the second ramp 14 is retained by one side of the second ramp stand 18. One end of a third ramp 14 is retained by the other side of the second ramp stand 18 and the other end of the third ramp 14 is retained by a third ramp stand 20.

With reference to FIG. 2, the second embodiment of the C-130 ramp system 2 is preferably used in the following manner for the C-130 military cargo airplane. One end of a first wedge 118 is retained by one side of a first ramp pad 12 and the other end of the first wedge 118 is laid on an airfield tarmac 100. One end of a first ramp 14 is retained by the other side of the ramp pad 12 and the other end of the first ramp 14 is retained by one side of a first ramp stand 16. One end of a second ramp 18 is retained by the other end of the first ramp stand 16 and the other end of the second ramp 14 is retained by one side of a second ramp stand 18. One end of a third ramp 14 is retained by the other side of the second ramp stand 18 and the other end of the third ramp 14 is retained by one side of a second ramp pad 12. One end of a second wedge 118 is retained by the other side of the second ramp pad 12 and the other end of the second wedge 118 is laid on a cargo door 102 of the C-130 cargo airplane.

With reference to FIG. 3, the C-5 or C-17 ramp system is preferably used in the following manner for the C-5 and C-17 military cargo airplanes. One end of a first wedge 118 is retained in one side of a first ramp pad 12 and the other end of the first wedge 118 is laid on an airfield tarmac 100. One end of a first ramp 14 is retained by the other side of the first ramp pad 12 and the other end of the first ramp 14 retained by one side of a first ramp stand 16. One end of a second ramp 14 is retained by the other end of the first ramp stand 16 and the other end of the second ramp 14 is retained by one end of a second ramp pad 12. One end of a second wedge 118 is retained by the other end of the second ramp pad 12 and the other end of the second wedge 118 is laid on a cargo door 104 of the C-5 or C-17.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:
1. A ramp system for a cargo airplane comprising:
a ramp pad having a first side and a second side;
a lead ramp having a first end retained by said first side of said ramp pad, a second end of said lead ramp is placed on an airfield surface;
a first ramp stand having a first side and a second side;

a first ramp having a first end retained by said second side of said ramp pad, a second end of said first ramp is retained by said first side of said first ramp stand;
a second ramp stand having a first side and a second side;
a second ramp having a first end retained by a second side of said first ramp stand, a second end of said second ramp is retained by said first side of said second ramp stand;
a third ramp stand; and
a third ramp having a first end retained by said second side of said second ramp, a second end of said third ramp is retained by said third ramp stand.

2. The ramp system for a cargo airplane of claim 1 wherein:
said ramp pad includes a cross member retainer, said cross member retainer includes a cross member, a plurality of lock tubes, and a pair of lock rods, said cross member includes two adjacent semi-circular grooves formed across a length thereof, said plurality of lock tubes are secured to each end of said two adjacent semi-circular grooves, said plurality of lock tubes are structured to receive said pair of lock rods.

3. The ramp system for a cargo airplane of claim 2 wherein:
said lead ramp includes a plurality of lead lengthwise tubes, a plurality of lead cleats and a hook end, said plurality of lead cleats are attached to a top of said plurality of lead lengthwise tubes, a mitered surface is created on one end of said plurality of lead lengthwise tubes for attachment of said hook end, said hook end is sized to be received by one of said two adjacent semi-circular grooves.

4. The ramp system for a cargo airplane of claim 2 wherein:
said ramp stand includes a support platform and an adjustable tube receiver, said support platform includes two receiver members that are removably retained on each end of a removable cross member, said adjustable tube receiver includes said cross member retainer and two tube extensions extending downward from each end of said cross member retainer, a height of said two tube extensions are selectively retained relative to said two receiver members.

5. The ramp system for a cargo airplane of claim 4 wherein:
said ramp includes a plurality of lengthwise tubes, a plurality of cleats and two hook ends, said plurality of cleats are attached to a top of said plurality of lengthwise tubes, a mitered surface is created on each end of said plurality of lengthwise tubes for attachment of said two hook ends, said hook end is sized to be received by one of said two adjacent semi-circular grooves.

6. The ramp system for a cargo airplane of claim 5, further comprising:
a plurality of bridge members are inserted and attached between adjacent lengthwise tubes of said plurality of lengthwise tubes.

7. The ramp system for a cargo airplane of claim 5, further comprising:
a foot plate is attached to an angled surface formed adjacent each mitered surface.

8. A ramp system for a cargo airplane comprising:
a first ramp pad having a first side and a second side;
a first wedge having a first end retained by said first side of said first ramp pad, a second end of said first wedge is placed on an airfield surface;
a first ramp stand having a first side and a second side;
a first ramp having a first end retained by said second side of said first ramp pad, a second end of said first ramp is retained by said first side of said first ramp stand;
a second ramp stand having a first side and a second side;
a second ramp having a first end retained by said second side of said first ramp stand, a second end of said second ramp is retained by said first side of said second ramp stand;
a second ramp pad having a first side and a second side;
a third ramp having a first end retained by said second side of said second ramp, a second end of said third ramp is retained by said first side of said ramp pad; and
a second wedge having a first end retained by said second side of said second ramp pad, a second end of said wedge is placed on a door of a cargo airplane.

9. The ramp system for a cargo airplane of claim 8 wherein:
said ramp pad includes a cross member retainer, said cross member retainer includes a cross member, a plurality of lock tubes, and a pair of lock rods, said cross member includes two adjacent semi-circular grooves formed across a length thereof, said plurality of lock tubes are secured to each end of said two adjacent semi-circular grooves, said plurality of lock tubes are structured to receive said pair of lock rods.

10. The ramp system for a cargo airplane of claim 9 wherein:
said wedge includes a plurality of wedge lengthwise tubes, a plurality of wedge cleats and a hook end, said plurality of wedge cleats are attached to a top of said plurality of wedge lengthwise tubes, a mitered surface is created on one end of said plurality of wedge lengthwise tubes for attachment of said hook end, said hook end is sized to be received by one of said two adjacent semi-circular grooves.

11. The ramp system for a cargo airplane of claim 9 wherein:
said ramp stand includes a support platform and an adjustable tube receiver, said support platform includes two receiver members that are removably retained on each end of a removable cross member, said adjustable tube receiver includes said cross member retainer and two tube extensions extending downward from each end of said cross member retainer, a height of said two tube extensions are selectively retained relative to said two receiver members.

12. The ramp system for a cargo airplane of claim 11 wherein:
said ramp includes a plurality of lengthwise tubes, a plurality of cleats and two hook ends, said plurality of cleats are attached to a top of said plurality of lengthwise tubes, a mitered surface is created on each end of said plurality of lengthwise tubes for attachment of said two hook ends, said hook end is sized to be received by one of said two adjacent semi-circular grooves.

13. The ramp system for a cargo airplane of claim 12, further comprising:
a plurality of bridge members are inserted and attached between adjacent lengthwise tubes of said plurality of lengthwise tubes.

14. The ramp system for a cargo airplane of claim 12, further comprising:
a foot plate is attached to an angled surface formed adjacent each mitered surface.

15. A ramp system for a cargo airplane comprising:
a first ramp pad having a first side and a second side;
a first wedge having a first end retained by said first side of said first ramp pad, a second end of said first wedge is placed on an airfield surface;
a first ramp stand having a first side and a second side;

a first ramp having a first end retained by said second side of said first ramp pad, a second end of said first ramp is retained by said first side of said first ramp stand;

a second ramp pad having a first side and a second side;

a second ramp having a first end retained by said second side of said second ramp, a second end of said first ramp stand is retained by said first side of said second ramp pad; and a second wedge having a first end retained by said second side of said second ramp pad, a second end of said wedge is placed on a door of a cargo airplane.

16. The ramp system for a cargo airplane of claim 15 wherein:

said ramp pad includes a cross member retainer, said cross member retainer includes a cross member, a plurality of lock tubes, and a pair of lock rods, said cross member includes two adjacent semi-circular grooves formed across a length thereof, said plurality of lock tubes are secured to each end of said two adjacent semi-circular grooves, said plurality of lock tubes are structured to receive said pair of lock rods.

17. The ramp system for a cargo airplane of claim 16 wherein:

said wedge includes a plurality of wedge lengthwise tubes, a plurality of wedge cleats and a hook end, said plurality of wedge cleats are attached to a top of said plurality of wedge lengthwise tubes, a mitered surface is created on one end of said plurality of wedge lengthwise tubes for attachment of said hook end, said hook end is sized to be received by one of said two adjacent semi-circular grooves.

18. The ramp system for a cargo airplane of claim 16 wherein:

said ramp stand includes a support platform and an adjustable tube receiver, said support platform includes two receiver members that are removably retained on each end of a removable cross member, said adjustable tube receiver includes said cross member retainer and two tube extensions extending downward from each end of said cross member retainer, a height of said two tube extensions are selectively retained relative to said two receiver members.

19. The ramp system for a cargo airplane of claim 18 wherein:

said ramp includes a plurality of lengthwise tubes, a plurality of cleats and two hook ends, said plurality of cleats are attached to a top of said plurality of lengthwise tubes, a mitered surface is created on each end of said plurality of lengthwise tubes for attachment of said two hook ends, said hook end is sized to be received by one of said two adjacent semi-circular grooves.

20. The ramp system for a cargo airplane of claim 19, further comprising:

a plurality of bridge members are inserted and attached between adjacent lengthwise tubes of said plurality of lengthwise tubes.

* * * * *